US009228111B2

(12) United States Patent
Cho et al.

(10) Patent No.: US 9,228,111 B2
(45) Date of Patent: Jan. 5, 2016

(54) RESIN COMPOSITION FOR SURFACE TREATMENT OF STEEL SHEET AND SURFACE-TREATED STEEL SHEET USING THE SAME

(75) Inventors: Jae Dong Cho, Gwangyang-si (KR); Jae Soon Lee, Daejeon (KR); Jae Ryung Lee, Goyang-si (KR); Sang Eun Shim, Incheon (KR)

(73) Assignee: POSCO, Pohang-si (KR)

( * ) Notice: Subject to any disclaimer, the term of this patent is extended or adjusted under 35 U.S.C. 154(b) by 574 days.

(21) Appl. No.: 13/141,110

(22) PCT Filed: Oct. 29, 2009

(86) PCT No.: PCT/KR2009/006309
§ 371 (c)(1),
(2), (4) Date: Jun. 21, 2011

(87) PCT Pub. No.: WO2010/053270
PCT Pub. Date: May 14, 2010

(65) Prior Publication Data
US 2011/0256387 A1  Oct. 20, 2011

(30) Foreign Application Priority Data
Nov. 5, 2008  (KR) ........................ 10-2008-0109459

(51) Int. Cl.
C09D 175/04  (2006.01)
C08G 18/32  (2006.01)
C08G 18/42  (2006.01)
C08G 18/44  (2006.01)
C08G 18/62  (2006.01)
C08K 3/04  (2006.01)

(52) U.S. Cl.
CPC .......... *C09D 175/04* (2013.01); *C08G 18/3215* (2013.01); *C08G 18/4277* (2013.01); *C08G 18/44* (2013.01); *C08G 18/6216* (2013.01); *C08K 3/04* (2013.01); *Y10T 428/265* (2015.01); *Y10T 428/31678* (2015.04)

(58) Field of Classification Search
CPC . Y10S 977/734; Y10S 977/70; Y10S 977/72; Y10S 977/722; Y10S 977/753; Y10S 977/783; Y10S 977/778; Y10S 977/847; Y10S 977/84; C01B 31/00; C01B 31/02; C01B 31/0206; C01B 31/0293; C01B 31/04; C01B 31/0438; C01B 31/0446; C01B 31/0484; C01B 31/0492; C01B 2204/00; C01B 2204/02; C01B 2204/06; C01B 2204/20; C01B 2204/22; C01B 2204/24; C01B 2204/26; C01B 2204/28; C01B 2204/32; C01B 2204/30; C01B 2204/04; C01B 2204/65; C09D 5/24; C09D 11/52; C09D 5/08; C09D 163/00; C09D 175/00; C09D 175/04; C09D 175/06; C09D 175/14; C23C 14/0605; C23C 18/1262; C08L 63/00

USPC ........ 977/734, 700, 720, 722, 762, 773, 778, 977/783, 842, 847; 252/500, 502, 510; 427/122, 249.1, 249.6; 428/457, 423.1, 428/425.8, 425.9, 413; 423/445 R, 448, 423/445 B

See application file for complete search history.

(56) References Cited

U.S. PATENT DOCUMENTS

| 4,129,611 | A | * | 12/1978 | Heiss ......................... 525/440.12 |
| 5,436,399 | A | * | 7/1995 | Koyama et al. ................. 528/59 |
| 5,494,990 | A | * | 2/1996 | Tagawa et al. .................. 528/73 |
| 6,248,456 | B1 | * | 6/2001 | Yamane et al. ............... 428/626 |
| 2001/0053841 | A1 | * | 12/2001 | Kaufhold et al. ............... 528/48 |
| 2005/0020466 | A1 | * | 1/2005 | Man et al. ..................... 510/392 |
| 2005/0271881 | A1 | * | 12/2005 | Hong ......................... 428/423.1 |
| 2006/0167203 | A1 | * | 7/2006 | Endo et al. ...................... 528/44 |
| 2007/0088146 | A1 | * | 4/2007 | Nakamura et al. .............. 528/44 |
| 2009/0227162 | A1 | | 9/2009 | Kruckenberg et al. |
| 2011/0049437 | A1 | | 3/2011 | Crain et al. |

FOREIGN PATENT DOCUMENTS

| JP | 2009120951 A | * | 6/2009 |
| KR | 10 0782640 B1 | | 11/2007 |
| KR | 10 0853127 B1 | | 8/2008 |
| WO | 2008048705 A2 | | 4/2008 |
| WO | WO 2008097343 A2 | * | 8/2008 |
| WO | 2009123771 A2 | | 10/2009 |

OTHER PUBLICATIONS

Machine translation of KR 10-0782640, retrieved Aug. 9, 2013.*
Machine translation of KR 10-0853127, retrieved Aug. 9, 2013.*
Machine translation of JP 2009120951 A, retrieved Aug. 12, 2013.*
Li et al., Science, vol. 320, 2008, pp. 1170-1171.*
OuYang et al., "Chemical Functionalization of Graphene Nanoribbons by Carboxyl groups on Stone-Wales Defects", J. Phys. Chem. C 2008, 112, 12003-12007.*
Aksay et al, "Functionalized Single Graphene Sheets Derived from Splitting Graphite Oxide", J. Phys. Chem. B 2006, 110, 8535-8539.*
Tamotsu Hashimoto et al., "Poly(tetramethylene ether) Glycol Containing Acetal Linkages: New PTMG-Based Polyol for Chemically Recyclable Polyurethane Thermoplastic Elastomer", Journal of Polymer Science: Part A, vol. 46, 1893-1901, accepted Oct. 2007, published 2008.*
Mitsumata et al., Kobunshi Ronbunshu, vol. 61, No. 6, pp. 352-357, Jun. 2002 (Japanese article).*

(Continued)

*Primary Examiner* — Callie Shosho
*Assistant Examiner* — Krupa Shukla
(74) *Attorney, Agent, or Firm* — The Webb Law Firm

(57) ABSTRACT

Provided is a resin composition for surface treatment of a steel sheet including a binder resin, graphene and a solvent. More particularly, as only a small amount of the graphene is included in the resin composition used for surface treatment of a steel sheet, a user-required electrical conductivity can be provided to the steel sheet.

5 Claims, 2 Drawing Sheets

(56) References Cited

OTHER PUBLICATIONS

Professional translation of Japanese article retrieved on Aug. 5, 2015 that is authored by Mitsumata et al. (Kobunshi Ronbunshu, vol. 61, No. 6, pp. 352-357, 2004).*

Stankovich, Sasha, et al., "Graphene-based composite materials", Nature, Jul. 20, 2006, pp. 282-286, vol. 442, Nature Publishing Group.

* cited by examiner

RESIN COMPOSITION FOR SURFACE TREATMENT OF STEEL SHEET AND SURFACE-TREATED STEEL SHEET USING THE SAME

TECHNICAL FIELD

The present invention relates to a resin composition for surface treatment of a steel sheet and a surface-treated steel sheet using the same, and more particularly, to a resin composition for surface treatment of a steel sheet, which is composed of a binder resin, graphene and a solvent, and is able to provide conductivity required by a user only with a small amount of graphene, compared to a conventional resin composition for surface treatment of a steel sheet that can provide conductivity through conductive particles such as metal powders or metal salts, and a surface-treated steel sheet using the same.

BACKGROUND ART

A surface treatment method of coating a chromate film is generally used to provide corrosion resistance and coating adherence to a zinc plating steel sheet and zinc-based alloy plating steel sheet, an aluminum plating steel sheet, aluminum-based alloy plating steel sheet, cold-rolled steel sheet and hot-rolled steel sheet, which are used as materials for automobiles, electronic appliances and construction. However, according to the necessity of several countermeasures for a working environment and drainage treatment due to toxicity of hexavalent chromium, a chromium-free surface treated steel sheet which can meet various demand characteristics including corrosion resistance, alkali resistance and conductivity has been developed.

However, a conventional surface-treated steel sheet to which organic or combined organic-inorganic coating is applied has problems of discoloration and degradation in physical properties due to deterioration of a resin component as thermal stability of a coating component such as an organic material in a PDP panel is degraded during a long-term use at a high temperature of 200 to 250° C. or more.

To solve these problems of the surface-treated steel sheet, a coating steel sheet using a silicon-or fluorine-based resin having excellent thermal resistance has been used in the art. However, since the coating steel sheet is generally coated to 20 to 30 μm on an under coat having a thickness of approximately 5 μm so as to ensure durability, it cannot ensure electric conductivity, and is expensive. Therefore, the coating steel sheet has been used only for exterior materials for decoration of electronic appliances. As a surface-treated steel sheet for interior materials of an electronic appliance, an anti-fingerprint steel sheet having a coating thickness of approximately 1 to 2 μm on a zinc plating steel sheet has been widely used.

As shown in FIG. 1, such an anti-fingerprint steel sheet is generally formed to have a zinc plating layer on a top surface of the steel sheet and a resin layer including metal powder and/or a metal salt having conductivity on the zinc plating layer so as to provide conductivity in addition to corrosion resistance and/or alkali resistance.

Here, as the metal powder and/or metal salt used to provide conductivity to the resin layer, generally, zinc oxide is used in some cases, and to achieve 100% conductivity, the zinc oxide should generally be included in an amount of approximately 3 parts by weight or more based on a solid content of a conductive resin composition to form a resin layer.

Meanwhile, while materials known so far as a crystalline body of carbon are only graphite and diamond, in 1985, Kroto of Sussex University in the UK and Smalley of Rice University in the US found the presence of a fullerene referred to as a third carbon allotrope from an experiment of vaporizing a graphite using a laser beam, and in 1990, Kratschmer of Germany and Huffman of the University of Arizona succeeded in mass production of fullerenes using an arc discharge method instead of a laser beam, which served as a momentum for the active research of carbon materials. The most important result obtained from such research is discovery of a carbon nanotube.

A carbon nanotube is a tube-shaped material formed in such a manner that carbon atoms bind to one another carbon in a hexagonal honeycombed pattern, and a diameter of the tube is ultimately small on a nanometer ($1/10^9$ meter) level.

A carbon nanotube exhibits characteristics of a conductor or semiconductor according to a degree of a twisted structure and has a quasi-one-dimensional structure, unlike graphite and diamond respectively having characteristics of a conductor and a nonconductor. The carbon nanotube is not only a nano-structure having an unusual quantum effect, but also has characteristics of a quantum wire through which electric current theoretically flows at an ultra-high speed at room temperature with no resistance. In addition, the carbon nanotube has an electric resistance lower than graphite at room temperature, and is at least 100 times stronger than steel, very lightweight and chemically stable. The carbon nanotube increases in a magnetic property as a temperature lowers, which indicates that the carbon nanotube is diamagnetic.

However, graphene, which has an excellent conductivity at least 50% higher than that of the carbon nanotube, has also been discovered. Graphene has a thickness of one atom and is a good conductor having excellent electric performance. In graphene, electrons move as if they do not have a rest mass and have an unusual type of quantum hall effect.

SUMMARY OF THE INVENTION

The present invention is directed to providing a resin composition for surface treatment of a steel sheet including graphene exhibiting a high conductivity in a small amount to provide conductivity to a resin layer coated on a surface of the steel sheet.

The present invention is also directed to providing a method of treating a surface of graphene with at least one hydrophilic functional group to improve dispersibility of the graphene included in the above-described resin composition for surface treatment of a steel sheet.

One aspect of the present invention provides a resin composition for surface treatment of a steel sheet, characterized in that the composition includes a binder resin, graphene and a solvent.

Another aspect of the present invention provides a steel sheet whose surface is treated with the resin composition for surface treatment of a steel sheet.

Still another aspect of the present invention provides a method of preparing a steel sheet including coating the resin composition for surface treatment of a steel sheet on a surface of a steel sheet.

According to the present invention, a resin composition for surface treatment of a steel sheet used to treat a surface of a steel sheet includes graphene, and thus only a small amount of the graphene can be used to provide user-required conductivity to the steel sheet.

In addition, the graphene included in the resin composition for surface treatment of a steel sheet is surface-treated with at least one hydrophilic functional group such as COOH or COO⁻, thereby improving dispersion stability of the graphene.

DETAILED DESCIPTION OF THE INVENTION

Figure 1:
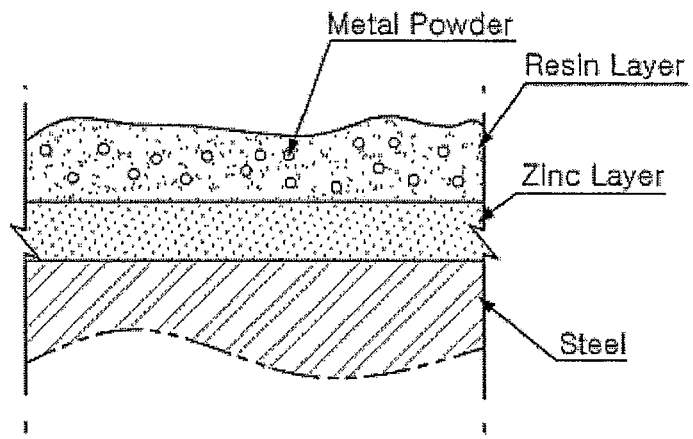
FIG. 1 is a configuration view of a surface-treated steel sheet of the prior art.
Figure 2:
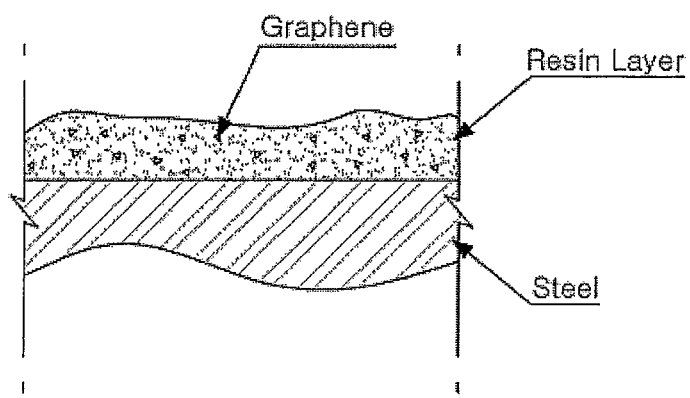
FIG. 2 is a configuration view of a surface-treated steel sheet according to the present invention.
Figure 3:
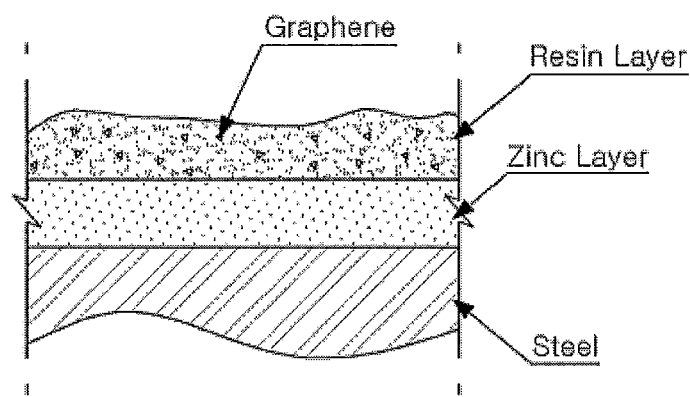
FIG. 3 is another configuration view of a surface-treated steel sheet according to the present invention.

The present invention relates to a resin composition for surface treatment of a steel sheet, characterized in that the composition includes a binder resin, graphene and a solvent.

The resin composition for surface treatment of a steel sheet according to the present invention including graphene is coated on a surface of a steel sheet, thereby forming a resin layer to provide conductivity. Any one of resin compositions conventionally used for this purpose in the art may be used as the resin composition according to the present invention.

The binder resin according to the present invention is included in the resin composition for surface treatment of a steel sheet and coated on a plated or non-plated steel sheet to form a metal steel sheet having improved scratch resistance and thermal resistance and excellent corrosion resistance and processability. Any one of binder resins conventionally used for this purpose may be used herein, particularly including at least one selected from the group consisting of a urethane resin, an acryl resin, an epoxy resin, an ester resin and an olefin resin, and more preferably, a urethane resin is used. The binder resin may be used in an amount of 10 to 90 parts by weight based on a total weight of the resin composition for surface treatment of a steel sheet.

Here, when the binder resin is included in an amount of less than 10 parts by weight of the total resin composition, salt water resistance of the binder resin, specifically, the urethane resin to penetration of conosive ions and drug resistance to penetration of a chemical material are not exhibited, and thus it is possible to degrade chemical resistance and alkali resistance. For this reason, when removal of fat is performed for 5 minutes at 60° C. with an alkali solution having a pH of 10 or more, the resin coating may be discolored or detached. When the binder resin is included in an amount of greater than 90 parts by weight, solution stability caused by coagulation may be degraded and a price may be increased.

Here, since the urethane resin has high water resistance, drug resistance, acid resistance and alkali resistance, and a formed coated layer is soft and strong, it is widely used to prevent surface scratches by being coated on a steel sheet or aluminum sheet, or provide chemical resistance. Any one of conventional urethane resins used for this purpose in the art can be used.

In addition, when a conventional urethane resin is independently used, it has a limitation in realizing soft and strong characteristics. Therefore, as the urethane resin according to the present invention, a mixture of a soft urethane-based resin and a hard urethane-based resin may be used.

In this case, the soft urethane-based resin may be included in an amount of 5 to 95 parts by weight based on a solid concentration of the urethane resin. Accordingly, when the solid concentration of the soft urethane-based resin is less than 5 parts by weight, the processability is improved but the thermal resistance and water degradation resistance are probably degraded. When the solid concentration of the soft urethane-based resin is greater than 95 parts by weight, the processability is hardly improved, and the corrosion resistance is considerably degraded.

The soft urethane-based resin may include a polyurethane resin prepared from isophorone diisocyanate, dibasic acid and polyvalent alcohol, for example, a polyurethane dispersion resin or a polyethylene-modified polyurethane resin; and a polyurethane resin prepared from acryl polyol and polyisocyanate, for example, an acryl-urethane resin or a polyethylene-acryl-modified polyurethane resin.

Here, as the polyvalent alcohol, acryl polyol, polyester polyol, polyether polyol, polyolefin-based polyol or a combination thereof may be used.

A molecular weight of the soft urethane-based resin may be 5,000 to 300,000. When the molecular weight of the soft urethane-based resin is less than 5,000, the processability is considerably degraded, and when the molecular weight of the soft urethane-based resin is greater than 300,000, stability of the solution may be decreased.

Meanwhile, the hard urethane-based resin may be a polyurethane resin prepared from polyaprolactone polyol or polycarbonate polyol and diisocyanate, particularly, paraphenylene diisocyanate; a polyurethane resin prepared from 4,4'-bis(ω-hydroyalkyleneoxy)biphenyl and methyl-2,6-diisocyanatehexanoate; or a polyurethane resin having an acetal bond.

A molecular weight of the hard urethane-based resin may be 200,000 to 2,000,000. When the molecular weight of the hard urethane-based resin is less than 200,000, the processability is hardly improved, and when the molecular weight of the hard urethane-based resin is greater than 2,000,000, the stability of the solution is decreased, and a viscosity of the resin solution is increased, thereby degrading workability.

Furthermore, the hard urethane-based resin may have a Shore A hardness of 40 to 90, particularly, in formation of a dry film. When the Shore A hardness is less than 40, the processability may hardly be improved, and when the Shore A hardness is greater than 90, the coated layer, i.e., the resin layer, is very hard, and thus disrupted during processing. Therefore, the processability is not improved.

Meanwhile, since the acryl resin has excellent high temperature/humidity resistance, cold hardiness and processability and is inexpensive, it is widely used for metal-surface treatment. As the acryl resin used in the present invention, an acryl-based resin synthesized to have conventional monomer compositions including sufficient carboxyl groups to be solubilized may be used. The acryl-based resin monomer may be, but is not limited to, methyl(meth)acrylate, ethyl(meth)acrylate, isopropyl(meth)acrylate, normalbutyl(meth)acrylate, isobutyl (meth)acrylate, 2-ethylhexyl(meth)acrylate, hydroxypropyl(meth)acrylate, stearyl(meth)acrylate, or hydroxybutyl(meth)acrylate.

A molecular weight of the acryl resin may be 50,000 to 2,000,000. When the molecular weight of the acryl-based resin is less than 50,000, the processability is hardly improved, and when the molecular weight of the acryl-based resin is greater than 2,000,000, the stability of the solution is reduced and the viscosity of the resin solution is increased, thereby degrading the workability.

The epoxy resin is widely used for a metal coating material due to excellent adhesion, corrosion resistance and top coat paintability. The epoxy resin which may be used in the present invention may be a bisphenol A-type resin, a bisphenol F-type resin and a novolac resin. A molecular weight of the epoxy resin may be 500 to 25,000. When the molecular weight of the epoxy resin is less than 500, a crosslinking density is increased and thus it is difficult to ensure the processability. When the molecular weight of the epoxy resin is greater than 25,000, it is difficult to be solubilized and the crosslinking density of a cured coat is reduced, thereby degrading corrosion resistance.

The ester resin is widely used as a metal surface treatment agent due to excellent curability, drug resistance, thermal resistance, plasticity and adhesion to an organic material. The ester resin which may be used in the present invention may be a polyester resin prepared from maleic anhydride, isophthalic acid, terephthalic acid, tetrahydrophthalic anhydride, methyltetrahydrophthalic anhydride, adipic acid and pimalic acid; and an ethyleneglycol-modified ester resin, a propyleneglycol-modified ester resin or neophentylglycol-modified ester resin.

A molecular weight of the ester resin may be 2,000 to 20,000. When the molecular weight of the ester resin is less than 2000, the crosslinking density is increased, and thus the processability is degraded, and when the molecular weight of the ester resin is greater than 20,000, the price is increased, and the crosslinking density is increased, thereby degrading saline resistance and corrosion resistance.

Among the binder resins, the olefin resin has an effect of preventing scratches of a painted surface after metal surface treatment because of good water resistance, acid resistance and saline resistance and a strong painting property. The olefin resin which may be used in the present invention may be an aqueous polyolefin resin, and polyethylene, a vinyl-modified polyethylene resin, a polyvinylbutylene resin, a vinylchloride copolymer resin, a vinyl acetate copolymer resin, or a polyvinylalcohol resin. A molecular weight of the olefin resin may be 50,000 to 2,000,000. When the molecular weight of the olefin resin is less than 50,000, the crosslinking density is increased, and thus it is difficult to ensure the processability, and when the molecular weight of the olefin resin is greater than 2,000,000, the olefin resin is difficult to solubilize, sedimentation of the resin occurs, and the crosslinking density of a cured coating is decreased, thereby degrading corrosion resistance.

The graphene according to the present invention provides conductivity to a steel sheet having a resin layer by applying, i.e., coating, a resin through surface treatment with a resin composition for surface treatment of a steel sheet. Any one of graphenes conventionally used for this purpose in the art may be used, and an amount of the graphene used may be 0.01 to 0.5 parts by weight, and preferably, 0.05 to 0.3 parts by weight, based on a total weight of the resin composition for surface treatment of a steel sheet.

Characteristically, the graphene according to the present invention may be surface-treated with at least one hydrophilic functional group to improve dispersion stability in the resin composition.

The hydrophilic functional group may be any one that can improve dispersibility, and thus may be used without limitation. The method of treating a surface used herein may be a conventional method. For the surface treatment, a hydrophilic functional group such as COOH or COO— may be directly used, and may also be substituted with various compounds such as a surfactant including the hydrophilic functional group.

Here, the COOH treatment, that is, the surface treatment for a graphene using a functional group, COOH, includes adding the graphene to an acid solution, treating the resulting solution with ultrasonic waves, and washing the resulting solution with water. Here, a pH of the graphene washed with water is approximately 6.

In addition, the COO— treatment, that is, the surface treatment of graphene using a functional group, COO—, includes adding the graphene to an acid solution, treating the resulting solution with ultrasonic waves, and washing the resulting solution with water and then with a basic aqueous solution. A pH of the graphene re-washed with the basic aqueous solution is approximately 7, and there is no particular limitation to the basic aqueous solution, and thus it may be a conventional basic aqueous solution used in the art. However, NaOH is preferred.

Meanwhile, in the surface treatment of the graphene with COOH or COO—, stirring the solution, which has gone through the ultrasonic treatment, for 10 to 30 hours at 100 to 250 rpm and at 100 to 120° C. may be further included. Here, the ultrasonic treatment refers to applying ultrasonic waves, preferably 10 to 20 KHz of ultrasonic waves, to the acid solution including the graphene for 10 to 20 minutes.

The acid solution used in the surface treatment of the graphene may be any one conventionally sued in the art, preferably a solution containing an inorganic acid including sulfuric acid, nitric acid or hydrochloric acid, and more preferably sulfuric acid and/or nitric acid.

The water used in the surface treatment of the graphene is not particularly limited, but preferably double distilled water.

The solvent according to the present invention may be composed of components excluding the solid content from the resin composition for surface treatment of a steel sheet. The solvent may be, but is not particularly limited to, any one conventionally used in the art, and water is preferred. An amount of the water used may be 9 to 90 parts by weight based on a total weight of the resin composition for surface treatment of a steel sheet.

Here, the solvent may further include an alcohol-based solvent and an alkali-based aqueous solution to increase characteristics such as wettability and dispersibility of the resin composition. The alcohol-based solvent may be ethanol, methanol, propanol, isopropanol or glycerol, and the alkali-based aqueous solution may be an amine compound, N-methylpirrolidone, sodium hydroxide, potassium hydroxide, sodium carbonate, or ammonium hydroxide.

The resin composition according to the present invention may further include a surfactant for the dispersion stability of the graphene. The surfactant may be, but is not limited to, dodecylbenzene sulfonic acid (DBSA), polyacrylic acid (PAA), sodium dodecyl sulfonate (SDS), polyvinyl alcohol (PVA), a glycerin ester of fatty acid polyoxylester compound, ammonium polyoxyethylene alkyl ester sulfate, or ammonium polyoxyethylene nonyl phenol ether phosphate. An amount of the surfactant used is not particularly limited, either, but may be 0.05 to 1.0 part by weight based on the weight of the resin composition.

The resin composition for surface treatment of a steel sheet may further include at least one additive selected from a wetting agent, a crosslinking agent, a lubricant, and a foaming agent. The wetting agent may have an effect in further improving stripyness and close adhesion, the crosslinking agent may have an effect in further improving corrosion resistance and alkali resistance, the lubricant may have an effect in further improving the coefficient of friction and processability, and the foaming agent may have an effect in further improving workability.

These additives may be used in an amount of 5 to 25 parts by weight based on the weight of the solid component of the resin composition. When the content of the additive is less than 5 parts by weight, there is no effect of using the additive such as the corrosion resistance or alkali resistance, and when the content of the additive is greater than 25 parts by weight, these effects are saturated. Thus, further addition of the additive is useless and may reduce solution stability.

The wetting agent may be a deflocculating wetting and dispersing agent or a polymeric wetting and dispersing agent, and preferably wetting and dispersing agents commercially available from EFKA and Tego, for example, EFKA 3580 (Ciba), BW-W500 (Buhmwoo) or WET500 (Ciba).

The crosslinking agent may be vinyl silane, methoxy silane, acrylsilane, epoxysilane, chlorosilane, alkoxysilane, silazane, a silylation agent, melamine, a melamine resin, alkylmelamine, an alkylmelamine resin, fluorinated melamine and a fluorinated melamine resin, or a polyamine-based, alkylated aromatic polyamine-based, polyamide-based or acid anhydride-based curing agent.

The lubricant may be a silicon wax, a polyethylene wax, a polypropylene wax, an amide wax, a polytetrafluoroethylene (PTFE) wax, or a paraffin wax.

The foaming agent may be an oil-, modified oil-, solution-, powder-or emulsion-type silicon foaming agent.

Also, the present invention relates to a steel sheet which is surface-treated to have a resin layer by coating the resin composition for surface treatment of a steel sheet according to the present invention.

The steel sheet means a metal used for materials for automobile, electronic appliances and construction, characteristically, an iron sheet. The steel sheet may be any one conventionally used for this purpose in the art, and preferably, a cold-rolled steel sheet; a zinc-based electroplating steel sheet such as a zinc plating steel sheet, zinc-nickel plating steel sheet, zinc-iron plating steel sheet, a zinc-titanium plating steel sheet, zinc-magnesium plating steel sheet, zinc-manganese plating steel sheet or zinc-aluminum plating steel sheet; a melt-plating steel sheet; an aluminum plating steel sheet; a plating steel sheet formed by adding a heterometal or impurities, for example, cobalt, molybdenum, tungsten, nickel, titanium, aluminum, manganese, iron, magnesium, tin or copper to the above plating layer; a plating steel sheet formed by dispersing an inorganic material such as silica or alumina to the above plating layer; an aluminum alloy sheet to which silicon, copper, magnesium, iron, manganese, titanium or zinc is added; a zinc plating steel sheet to which a phosphate is applied; or a hot-rolled steel sheet. When necessary, a multi-layered plating layer sequentially treated with at least two kinds of the plating may be used.

An adhering amount after drying of the resin layer formed by applying, i.e., coating the resin composition for surface treatment of a steel sheet of the present invention may be 300 to 2,500 $mg/m^2$. When the adhering amount after drying of the resin layer is greater than 2,500 $mg/m^2$, a surface resistance value may be considerably increased, even if the electric conductivity with respect to the graphene is increased. When the adhering amount after drying of the resin layer is less than 300 $mg/m^2$, the corrosion resistance and processability are considerably degraded, and thus the steel sheet is difficult to use in parts of electronic appliances.

In addition, the present invention relates to a method of preparing a surface-treated steel sheet including coating the resin composition for surface treatment of a steel sheet according to the present invention on a surface of the steel sheet.

The method of coating the resin composition on the steel sheet is not particularly limited, but may be performed using a known coating method, for example, bar coating, dip coating, roll coating, curtain coating, spray coating, slit coating, or gravure coating.

The method of preparing a steel sheet according to the present invention may further include drying the steel sheet coated with the resin composition for surface treatment of a steel sheet at 80 to 240° C. Here, the higher a drying temperature is, the more improved corrosion resistance of the resin layer is. However, when the drying temperature is greater than 240° C., the resin is deteriorated, and thus desired physical properties cannot be ensured, and when the drying temperature is in the range of 80 to 240° C., it is reasonable to meet qualities required by a user.

EXAMPLES

Hereinafter, the present invention will be described in further detail with respect to Examples. However, the following Examples are merely provided to describe the present invention in detail, not to limit the scope of the present invention.

Preparation Example 1

Surface Treatment of Graphene using Functional Group COOH 2 g of graphene (S2194, Graphene Industries, UK or Graphene-P, N-baro Tech, Korea) was added to 250 ml of a solution including 8 ml of sulfuric acid (Reagent grade 95 to 98%, Aldrich Chemical, US.) and 22 ml of nitric acid (ACS Reagent 70%, Aldrich Chemical, US.), and then the resulting solution was treated with an ultrasonic device (BANDELIN electronic, SONOPULS HD2200, Germany) for 15 minutes and stirred.

Subsequently, the treated mixed solution including the graphene was stirred using a mechanical stirrer (IKA, RW20, Germany) at 110° C. and 200 rpm for 24 hours.

Afterwards, the resulting solution was washed with water and filtered six times using a filter (Whatmann6722-1001, Germany) to adjust the pH to approximately 6. Finally, the graphene was treated with COOH.

Preparation Example 2

Surface Treatment of Graphene using Functional Group $COO^-$ 2 g of graphene (S2194, Graphene Industries, UK or Graphene-P, N-baro Tech, Korea) was added to 250 ml of a solution including 8 ml of sulfuric acid (Reagent grade 95 to 98%, Aldrich chemical, US) and 22 ml of nitric acid (ACS Reagent 70%, Aldrich Chemical, US.), and then the resulting solution was treated with an ultrasonic device (BANDELIN electronic, SONOPULS HD2200, Germany) for 15 minutes and stirred.

Subsequently, the treated mixed solution including the graphene was stirred using a mechanical stirrer (IKA, RW20, Germany) at 110° C. and 200 rpm for 24 hours.

Afterwards, the resulting solution was washed with water and filtered six times using a filter (Whatmann 6722-1001, Germany). A pH of the solution was adjusted to approximately 6.

Then, the graphene having a pH of approximately 6 was washed with 10 parts by weight of a NaOH aqueous solution, and washed with double distilled water to adjust the pH to approximately 7, and then dried. Finally, the graphene was treated with $COO^-$.

Example 1

A resin composition for surface treatment of a steel sheet was prepared by mixing and stirring 15 g of a urethane resin (PU Binder 2173, Buhmwoo, Korea), 0.05 g of graphene (S2194, Graphene Industries, UK or Graphene-P, N-baro Tech, Korea), 0.15 g of sodium dodecyl sulfate (SDS) as a surfactant and 100 ml of water for 10 minutes.

The prepared resin composition for surface treatment was coated on a zinc electroplating steel sheet, one surface of which has a zinc-adhering amount of 20 g, to have a resin-adhering amount after drying of 2,000 mg/m$^2$, and then cured at 200° C.

Example 2

A resin composition for surface treatment of a steel sheet was prepared by mixing and stirring 15 g of a urethane resin (PU Binder 2173, Buhmwoo, Korea), 0.05 g of the COOH-treated graphene prepared in Preparation Example 1, 0.02 g of a SDS surfactant (Sodium Dodecyl sulfate, ACS Reagent Grade >99.0%, Aldrich Chemical, America) and 100 ml of water for 10 minutes.

The prepared resin composition for surface treatment was coated on a zinc electroplating steel sheet, one surface of which has a zinc-adhering amount of 20 g, to have a resin-adhering amount after drying of 2,000 mg/m$^2$, and then cured at 200° C.

Example 3

The process was performed as described in Example 2, except that a 0.05 g of the COO$^-$-treated graphene prepared in Preparation Example 2 was used, instead of the 0.05 g of the COOH-treated graphene prepared in Preparation Example 1.

The prepared resin composition for surface treatment was coated on a zinc electroplating steel sheet, one surface of which has a zinc-adhering amount of 20 g, to have a resin-adhering amount after drying of 2,000 mg/m$^2$, and then cured at 200° C.

Example 4

A resin composition for surface treatment of a steel sheet was prepared by mixing and stirring 15 g of a bisphenol A-type epoxy resin (KEM-101-50, Kukdo Chemical, Korea) as an epoxy resin, 0.05 g of the COO$^-$-treated graphene prepared in Preparation Example 2, 0.02 g of a SDS surfactant (Sodium Dodecyl sulfate, ACS Reagent Grade >99.0%, Aldrich chemical, America) and 100 ml of water for 10 minutes.

The prepared resin composition for surface treatment was coated on a zinc electroplating steel sheet, one surface of which having a zinc-adhering amount of 20 g, to have a resin-adhering amount after drying of 2000 mg/m$^2$, and then cured at 200° C.

Example 5

A resin composition for surface treatment of a steel sheet was prepared by mixing and stirring 15 g of an acryl resin (DESMOPHEN A-365, Bayer, Germany), 0.05 g of the COO$^-$-treated graphene prepared in Preparation Example 2, 0.02 g of a SDS surfactant (Sodium Dodecyl sulfate, ACS Reagent Grade >99.0%, Aldrich Chemical, US.) and 100 ml of water for 10 minutes.

The prepared resin composition for surface treatment was coated on a zinc electroplating steel sheet, one surface of which has a zinc-adhering amount of 20 g, to have a resin-adhering amount after drying of 2,000 mg/m$^2$, and then cured at 200° C.

Example 6

A resin composition for surface treatment of a steel sheet was prepared by mixing and stirring 15 g of a polyester resin [WSR-3150, Woojung, Korea], 0.05 g of the COO$^-$-treated graphene prepared in Preparation Example 2, 0.02 g of a SDS surfactant (Sodium Dodecyl sulfate, ACS Reagent Grade >99.0%, Aldrich Chemical, US.) and 100 ml of water for 10 minutes.

The prepared resin composition for surface treatment was coated on a zinc electroplating steel sheet, one surface of which has a zinc-adhering amount of 20 g, to have a resin-adhering amount after drying of 2,000 mg/m$^2$, and then cured at 200° C.

Comparative Example 1

A resin composition for surface treatment of a steel sheet was prepared by mixing and stirring 15 g of a urethane resin (PU Binder 2173, Buhmwoo, Korea), 3.0 g of zinc oxide having an average particle size of 100 nm [ZnO sol in water, 20 wt %, Advanced Nano Products, Korea], 100 ml of water and 0.02 g of a SDS surfactant (Sodium Dodecyl sulfate, ACS Reagent Grade >99.0%, Aldrich Chemical, US.) for 10 minutes.

The prepared resin composition for surface treatment was coated on a zinc electroplating steel sheet, one surface of which has a zinc-adhering amount of 20 g, to have a resin-adhering amount after drying of 2,000 mg/m$^2$, and then cured at 200° C.

Comparative Example 2

A resin composition for surface treatment of a steel sheet was prepared by mixing and stirring 15 g of a urethane resin (PU Binder 2173, Butnnwoo, Korea), 0.05 g of a mult-wall carbon nanotube (MWCNT, Advanced Nano Products, Korea) treated with COOH according to Preparation Example 1, 100 ml of water and 0.02 g of a SDS surfactant (Sodium Dodecyl sulfate, ACS Reagent Grade >99.0%, Aldrich Chemical, US.) for 10 minutes.

The prepared resin composition for surface treatment was coated on a zinc electroplating steel sheet, one surface of which has a zinc-adhering amount of 20 g, to have a resin-adhering amount after drying of 2,000 mg/m$^2$, and then cured at 200° C.

Comparative Example 3

A resin composition for surface treatment of a steel sheet was prepared by mixing and stirring 15 g of a urethane resin (PU Binder 2173, Buhmwoo, Korea), 0.05 g of the COOH-treated graphene prepared in Preparation Example 1, 0.02 g of a SDS surfactant (Sodium Dodecyl sulfate, ACS Reagent Grade >99.0%, Aldrich Chemical, US.) and 100 ml of water for 10 minutes.

The prepared resin composition for surface treatment was coated on a zinc electroplating steel sheet, one surface of which has a zinc-adhering amount of 20 g, to have a resin-adhering amount after drying of 3,000 mg/m$^2$, and then cured at 220° C.

Experiment

Conductivity, dispersion stability, white chromaticity, corrosion resistance, cohesion and processability of the resin compositions for surface treatment of a steel sheet prepared according to Examples 1 to 3 and Comparative Examples 1 to 3 were measured by the following methods.

(1) Conductivity: A surface of a specimen coated with a resin coating was measured using a surface resistance measurer (Loresta-GP), and then evaluated according to the following criteria.
  ○: Surface resistance was 0.1 inΩ or less
  □: Surface resistance was 0.1Ω or less
  x: Surface resistance was 0.1Ω or more and conductivity or weldability was extremely poor (2) Dispersion Stability: 100 g of a resin composition for surface treatment was left in an oven at 50° C. for 10 days, and then degrees of precipitation, gelation and separation of the solution were evaluated according to the following criteria.
  ○: No precipitation, gelation or separation occurred.
  □: One of precipitation, gelation and separation slightly occurred.
  x: At least one of precipitation, gelation and separation occurred to an extent or more.

(3) White Chromaticity: White chromaticity (L) of a resin coating layer was measured using a colorimeter (Minolta Cxxx), and then evaluated according to the following criteria.
  ○: White chromaticity is 75.0 or more.
  □: White chromaticity is 70.0 to less than 75.0.
  x: White chromaticity is 70.0 or less.

(4) Corrosion Resistance: A specimen was subjected to a saline spray test according to JIS-Z2371 for 96 hours, and then a degree of corrosion was evaluated according to the following criteria.
  ○: Degree of white rust is less than 5%.
  □: Degree of white rust is 5 to less than 20%.
  x: Degree of white rust is 20% or more.

(5) Cohesion: A surface of a specimen was cross-cut into 100(1×1 mm) slices. A tape (Nichiban 405) was adhered and pressed to the surface of the specimen. After detachment of the tape, a number of the slices detached were counted to evaluate the cohesion according to the following criteria.
  ○: No slices detached.
  □: 5 or less slices were detached.
  x: 6 or more slices were detached.

(6) Processability: The coefficient of friction was measured using a draw bead friction tester (load: 1000 $kg_f$, speed: 1000 mm/min and length 100 mm), and an area of a damaged resin coating of a specimen obtained by being scratched by a bead surface of the friction tester was evaluated according to the following criteria.
  ○: Damaged area was less than 5%.
  □: Damaged area was 5% to less than 10%.
  x: Damaged area was 10% or more.

The evaluation results described above are listed in the following Table 1.

TABLE 1

| | Example 1 | Example 2 | Example 3 | Comparative Example 1 | Comparative Example 2 | Comparative Example 3 |
|---|---|---|---|---|---|---|
| Conductivity | ○ | ○ | ○ | □ | ○ | x |
| Dispersion Stability | □ | ○ | ○ | □ | □ | ○ |
| White Chromaticity | ○ | ○ | ○ | ○ | x | ○ |
| Corrosion Resistance° | ○ | ○ | ○ | □ | ○ | ○ |
| Cohesion | ○ | ○ | ○ | □ | ○ | ○ |
| Processability | ○ | ○ | ○ | ○ | ○ | ○ |

According to the present invention, as a resin composition for surface treatment of a steel sheet used to surface-treat a steel sheet includes a small amount of graphene, user-required conductivity can be provided to the steel sheet, and as the graphene included in the resin composition for surface treatment of a steel sheet is surface-treated with at least one hydrophilic functional group such as COOH or COO$^-$, dispersion stability of the graphene can be improved.

While the invention has been shown and described with reference to certain exemplary embodiments thereof, it will be understood by those skilled in the art that various changes in form and details may be made therein without departing from the scope of the invention as defined by the appended claims.

The invention claimed is:

1. A surface-treated steel sheet having a resin layer formed by coating a resin composition for surface treatment of a steel sheet comprising a binder resin, a graphene, and a solvent,
  wherein the binder resin is a urethane resin,
  wherein the urethane resin includes 5 to 95 parts by weight of a soft urethane-based resin and 5 to 95 parts by weight of a hard urethane-based resin based on a solid content of the urethane resin,
  wherein the soft urethane-based resin is a polyurethane resin prepared from isophorone diisocyanate, dibasic acid, and polyvalent alcohol; or a polyurethane resin prepared from acryl polyol and polyisocyanate,
  wherein the soft urethane-based resin has a number average molecular weight of 5,000 to 300,000,
  wherein the hard urethane-based resin is a polyurethane resin prepared from 4,4'-bis(ω-hydroxyalkyleneoxy)biphenyl and methyl-2,6-diisocyanatehexanoate,
  wherein the hard urethane-based resin has a number average molecular weight of 200,000 to 2,000,000,
  wherein the hard urethane-based resin has a Shore A hardness of 40 to 90,
  wherein the graphene is surface-treated with at least one hydrophilic functional group,
  wherein the hydrophilic functional group is COOH or COO$^-$, and
  wherein the resin layer has a thickness of 2.5 μm or less.

2. The surface-treated steel sheet of claim 1, wherein the resin layer has an adhering amount after drying of 300 to 2,500 mg/m$^2$.

3. The surface-treated steel sheet of claim 1, wherein the resin composition comprises 10 to 90 parts by weight of the binder resin, 0.01 to 0.5 parts by weight of the graphene, and 9 to 90 parts by weight of the solvent based on a total weight of the resin composition used for surface treatment of the steel sheet.

4. The surface-treated steel sheet of claim 1, wherein the solvent is water, an alcohol solvent, an alkali-based aqueous solution, or a combination thereof.

5. The surface-treated steel sheet of claim 1, wherein the resin composition further comprises, based on the total solid content of the resin composition used for surface treatment of the steel sheet:
  5 to 25 parts by weight of an additive composed of a wetting agent, a crosslinking agent, a lubricant, a foaming agent, or a combination thereof; and
  0.05 to 1.0 parts by weight of a surfactant.

* * * * *